United States Patent [19]

Bourquin et al.

[11] 4,193,220
[45] Mar. 18, 1980

[54] FISHING APPARATUS

[76] Inventors: George W. Bourquin, 710 Sierra Rd. West; Louis LaFontain, 1627 Hollins Ave., both of Helena, Mont. 59601

[21] Appl. No.: 875,290

[22] Filed: Feb. 6, 1978

[51] Int. Cl.² .......................................... H01K 97/00
[52] U.S. Cl. ...................................................... 43/15
[58] Field of Search ...................................... 43/15, 16

[56] References Cited

U.S. PATENT DOCUMENTS

| 3,474,561 | 10/1969 | McConkey | 43/16 |
| 3,686,785 | 8/1972 | Dixon | 43/15 |

FOREIGN PATENT DOCUMENTS 19535 of 1890 United Kingdom ..................... 43/15

Primary Examiner—Robert C. Watson
Attorney, Agent, or Firm—Arthur L. Urban

[57] ABSTRACT

Fishing apparatus including a longitudinal support member, a cross member pivotable to a position longitudinal of the support member, a coil spring member having a coil portion and substantially straight arms extending a significant distance from each end of the coil portion, one of the arms of the coil spring member being affixed to the support member so the second arm of the spring member is disposed longitudinally of the support member and biased away from the support member, the second spring arm being of a length so that when the second spring arm is disposed adjacent to the support member the free end of the second spring arm extends beyond an end of the support member, the free end of the second spring arm having a line-guiding portion, a rotatable line storage reel mounted on the support member between the coil portion of the coil spring member and the end of the support member remote from the free end of the second spring arm, locking means engageable with the second spring arm mounted on the support member, and latching means mounted on the support member adjacent the free end of the second spring arm; the latching means including a hook portion engageable with the second spring arm and pivotable transversely of the support member, a support portion pivotally connected to the hook portion, and biasing means urging the hook portion away from the support portion.

8 Claims, 4 Drawing Figures

U.S. Patent   Mar. 18, 1980   4,193,220
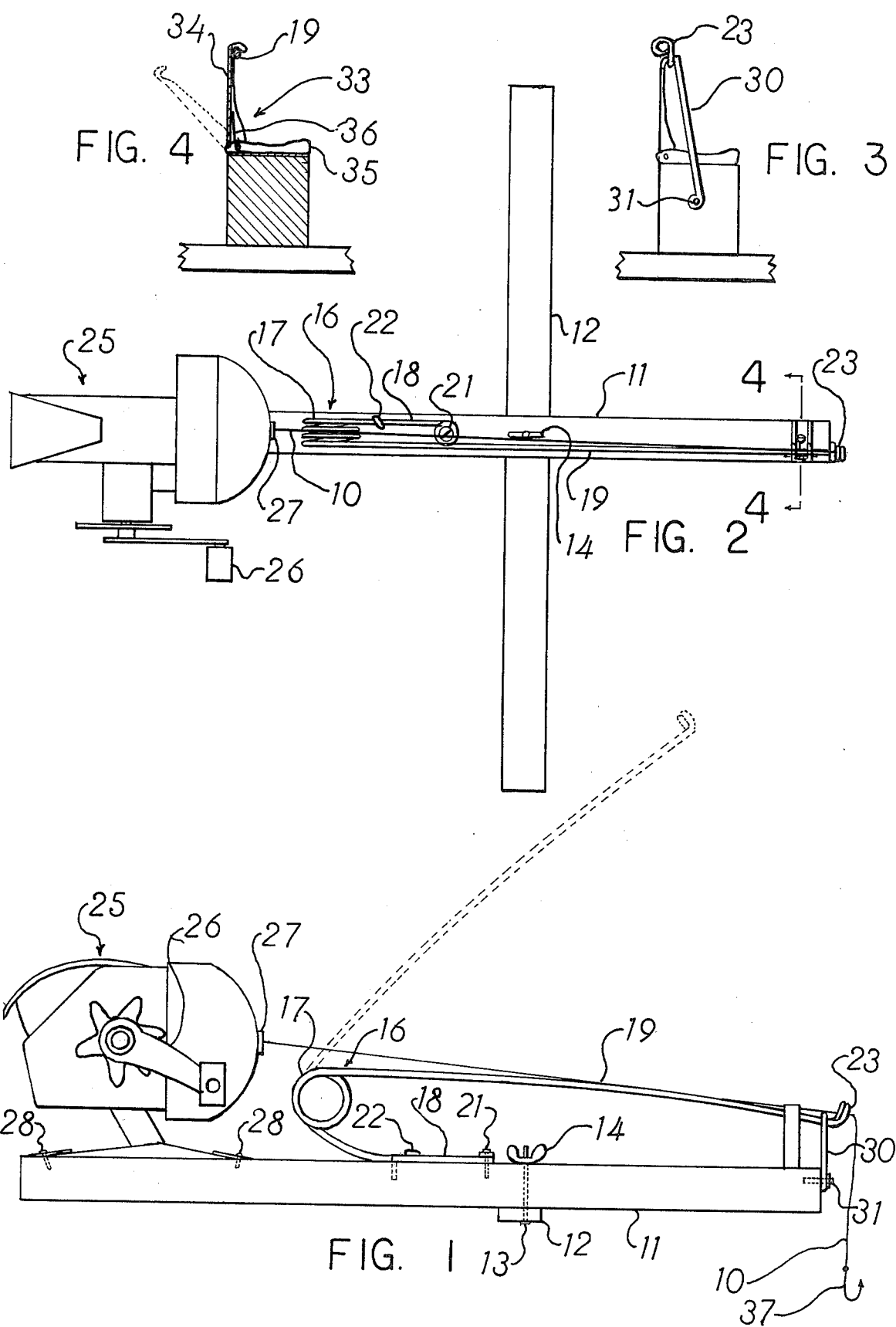

FISHING APPARATUS

This invention relates to a novel fishing apparatus and more particularly relates to a new fishing apparatus which sets a hook in a fish.

Fishermen frequently throw out a number of lines to increase the chances of achieving their limit of fish. This is done when fishing from shore, a boat or when ice fishing. Various signal devices have been employed to alert the fisherman that a fish has taken the hook on a particular line. Such signal devices include bobbers, tip-ups and the like. When the fisherman sees the signal from the device, he rushes to the line and gives it a sudden tug to set the hook in the mouth of the fish.

If the fisherman delays setting the hook, the fish may slip off the hook and escape. The fisherman may lose the fish if he does not see the signal when it first is given and react immediately. Thus, the fisherman is faced with a dilemma. Should he give his full attention to the signal devices in order to maximize his catch or should he relax and enjoy his surroundings and fellowship with his companions but expect to lose part of his catch because of his lack of attention to his lines.

While it would be desirable to set a hook in the mouth of a fish automatically without action on the part of the fisherman, devices which presently are commercially available do not accomplish this result. If a fisherman wishes to set a hook in a fish's mouth automatically, he must design and construct his own device. Unless the fisherman has considerable time and mechanical aptitude, the devices produced will be makeshift and unsatisfactory in their performance both from an operational and a durability standpoint. Thus, there is a need for a well designed fishing device which can successfully accomplish the task of setting a hook in the mouth of a fish without action on the part of the fisherman.

The present invention provides a novel fishing apparatus which is capable of setting a hook in the mouth of a fish when the fish has taken the baited hook. The fishing apparatus of the invention accomplishes this result with a high degree of success so the loss of fish off a line is substantially eliminated. Furthermore, the fishing apparatus is convenient to use with a minimum of instruction. Also, the apparatus is simple in design and of a size which facilitates carrying and storage. In addition, the fishing apparatus of the invention does not operate prematurely if a fish is only mouthing the hook. Moreover, the fishing apparatus of the invention is relatively inexpensive to manufacture so a fisherman can own several to accommodate all of his requirements without a large monetary outlay.

Other benefits and advantages of the novel fishing apparatus of the present invention will be apparent from the following description and the accompanying drawing in which:

FIG. 1 is a side elevation of one form of the novel fishing apparatus of the present invention;

FIG. 2 is a top view of the fishing apparatus shown in FIG. 1;

FIG. 3 is a right end view of the fishing apparatus of FIG. 1 showing the hook and latch; and FIG. 4 is a sectional view taken along line 4—4 of FIG. 1.

As shown in the drawings, a novel fishing apparatus of the present invention includes a longitudinal main support member 11 with a cross member 12 which is pivotally connected thereto with a screw 13 and a wing nut 14. Loosening wing nut 14 allows cross member 12 to be pivoted from a position transverse to support member 11 to a position longitudinal thereof for carrying and storage.

A coil spring member 16 is affixed to support member 11. Spring member 16 has a coil portion 17 and two substantially straight arms 18 and 19 extending a significant distance from each end of the coil portion 17. Arm 18 of the spring member 16 is secured to support member 11 with suitable fasteners such as screw 21 and staple 22. For added rigidity, arm 18, in addition to the straight section extending between coil portion 17 and screw 21, has a second straight section extending from screw 21 back toward the coil portion.

Arm 18 is affixed to support member 11 so arm 19 will be aligned longitudinally with and biased away from the support member. Arm 19 is of a length to extend beyond the end of the support member 11 when the arm is disposed adjacent to the support member. The overhanging free end of arm 19 has a line-guiding portion shown as pig tail guide 23.

A rotatable line storage reel 25 is mounted on support member 11 between the coil portion 17 of the spring member 16 and the end of the support member remote from the free end of the arm 19. Reel 25 may be a commercially available fishing reel with a winding handle 26 and line guiding means 27. Line guide 27 advantageously is aligned longitudinally with arm 19. Reel 25 may be secured to support member 11 with suitable fasteners shown as screws 28.

Locking means to restrain arm 19 during carrying and storage are mounted on support member 11. As shown in the drawings, a hook 30 pivotally connected to support member 11 may be utilized to lock arm 19. Hook 30 may be fastened to support member 11 adjacent the free end of arm 19 with a screw 31.

Latching means 33 also are mounted on support member 11 adjacent the free end of arm 19. Latching means 33 as shown includes a support portion 34, a hook portion 35 pivotally connected thereto and biasing means 36. The support portion 34 is affixed to support member 11 so hook portion 35 will be engageable with arm 19 and will be pivotable transversely of the arm and support member. Biasing means 36 urges the hook portion 35 away from support portion 34.

The novel fishing apparatus of the present invention as shown in the drawings is set up for use by first positioning cross member 12 transversely to support member 11 and tightening wing nut 14. Next, fishing line 10 is drawn from line guide 27 of reel 25 and threaded through guide 23 at the free end of arm 19. A hook 37 or a suitable lure may be attached to the end of line 10.

Arm 19 is pressed toward support member 11 and locking hook 30 moved away from engagement with the arm. Before releasing the pressure on arm 19, the hook portion 34 of latch 33 is moved against arm 19. Pressure on arm 19 then is released slowly while holding hook portion 34 against the arm until the hook end engages the arm.

A suitable length of line 10 is drawn through guides 23 and 27 and the apparatus positioned for fishing. For example, the apparatus may be positioned next to a hole in the ice or on the edge of a bank, pier or boat with the free end of arm 19 over the water. The end of the line 10 with a baited hook or lure is lowered into the water to the desired depth and reel 25 locked. The apparatus may be weighted, tied down or otherwise secured if desired or required.

When a fish has taken the baited hook into its mouth and starts to swim away, the line 10 will be pulled. Since reel 25 is locked, increased tension on line 10 by the pull of the fish will depress arm 19 sufficiently to disengage it from hook portion 34 of latch 33 allowing spring 36 to move the hook portion away from the arm. This permits arm 19 to move suddenly upwardly away from support member 11. Advantageously, the movement of arm 19 is limited to an acute angle as shown by the dotted outline thereof in FIG. 1. The sudden upward arcute movement of line guide 23 at the end of arm 19 will cause a sudden jerk in line 10 setting the hook in the mouth of the fish at the end of the line.

Setting the hook holds the fish securely on the line so it cannot escape. The fisherman at his leisure then can pick up the apparatus and draw the fish from the water by winding the reel handle 26. After removing the fish from the hook, the hook is rebaited and the latch reset as described above. Then, the apparatus can be positioned over the water and the baited hook lowered into the water to the desired depth again.

The above description and the accompanying drawings show that the present invention provides a novel fishing apparatus which is highly successful in setting a hook in the mouth of a fish. Moreover, the fishing apparatus of the invention substantially eliminates the loss of fish off a line. In addition, the fishing apparatus is simple in design and convenient to use with a minimum of instruction. Also, the design of the apparatus facilitates carrying and storage. A further advantage of the fishing apparatus of the invention is that it does not operate until the fish actually has taken the hook into its mouth. Further, the fishing apparatus can be manufactured from commercially available materials relatively inexpensively. The low cost of the fishing apparatus of the invention permits a fisherman to own several without a large cash outlay so that he can accommodate all of his requirements. The fishing apparatus does not require constant attention on the part of the fisherman and thus increases his enjoyment of the sport.

It will be apparent that various modifications can be made in the particular fishing apparatus described in detail above and shown in the drawings within the scope of the invention. For example, the support member 11 and the cross member 12 may be made in different configurations and of other structural materials such as wood, metal, plastic, etc. and combinations thereof. Also, line guide 23 may be a separate piece from arm 19. In addition, reel 25 may be of another design. Therefore, the scope of the invention is to be limited only by the following claims.

What is claimed is:

1. Fishing apparatus including a longitudinal support member, a pivotable cross member securable in a position transverse of said support member, a coil spring member having a coil portion and substantially straight arms extending a significant distance from each end of said coil portion, one of said arms of said coil spring member being affixed to said support member so a second arm of said spring member is disposed longitudinally of said support member and biased away from said support member, said second spring arm being of a length so that when said second spring arm is disposed adjacent to said support member the free end of said second spring arm extends beyond an end of said support member, said free end of said second spring arm having a line-guiding portion, a rotatable line storage reel mounted on said support member between said coil portion of said coil spring member and the end of said support member remote from said free end of said second spring arm, locking means engageable with said second spring arm mounted on said support member, said locking means including a hook portion at the free end thereof, and latching means mounted on said support member adjacent said free end of said second spring arm; said latching means including a hook portion engageable with said second spring arm and pivotable transversely of said support member, a support portion pivotally connected to said hook portion, and biasing means urging said hook portion away from said support portion.

2. Fishing apparatus according to claim 1 wherein said line storage reel has line-guiding means longitudinally aligned with said second spring arm.

3. Fishing apparatus according to claim 1 wherein said second spring arm moves through an acute angle.

4. Fishing apparatus according to claim 1 wherein said locking means is a hook pivotally connected to said support member.

5. Fishing apparatus according to claim 4 wherein said hook is mounted on said support member adjacent the free end of said second spring arm.

6. Fishing apparatus according to claim 1 wherein said coil portion of said coil spring member has at least two coils.

7. Fishing apparatus according to claim 1 wherein said coil portion of said coil spring member has a diameter of about one inch.

8. Fishing apparatus according to claim 1 wherein said cross member is connected to said support member with a screw and wing nut.

* * * * *